(12) United States Patent
Bellrose et al.

(10) Patent No.: US 10,832,272 B2
(45) Date of Patent: Nov. 10, 2020

(54) GAMIFICATION SYSTEM FOR MOTIVATING TRAVELERS TO KEEP TRACK OF THEIR BAGGAGE TO IMPROVE TRANSPORTATION HUB SECURITY

(71) Applicant: International Business Machines Corporation, Armonk, NY (US)

(72) Inventors: Schayne Bellrose, Poughkeepsie, NY (US); Pasquale A. Catalano, Wallkill, NY (US); Prach J. Chuaypradit, Morrisville, NC (US); Andrew G. Crimmins, Montrose, NY (US); Nicholas W. Crimmins, Montrose, NY (US); Preston D. Lane, Poughkeepsie, NY (US); Juan D. Merchan, Poughkeepsie, NY (US); Rorie Paul Reyes, Kingston, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 339 days.

(21) Appl. No.: 15/787,378

(22) Filed: Oct. 18, 2017

(65) Prior Publication Data

US 2019/0114659 A1     Apr. 18, 2019

(51) Int. Cl.
*G06Q 30/02* (2012.01)

(52) U.S. Cl.
CPC ..... *G06Q 30/0235* (2013.01); *G06Q 30/0236* (2013.01)

(58) Field of Classification Search
CPC .................................................. H04W 4/029
See application file for complete search history.

(56) References Cited

U.S. PATENT DOCUMENTS

| 8,742,922 | B2 | 6/2014 | Ferrari |
| 8,821,272 | B2 | 9/2014 | Thomas et al. |
| 9,398,795 | B2 | 7/2016 | Gupta et al. |
| 9,424,547 | B2 | 8/2016 | Gazdzinski et al. |
| 2006/0087432 | A1 | 4/2006 | Corbett, Jr. |
| 2009/0276089 | A1 | 11/2009 | Bartholomew |
| 2013/0217333 | A1* | 8/2013 | Sprigg ............ H04W 4/80 455/41.2 |
| 2015/0120408 | A1* | 4/2015 | Liu ............ G06Q 30/0209 705/14.12 |
| 2015/0154847 | A1* | 6/2015 | Oliver ............ G08B 21/0247 340/686.6 |
| 2016/0292980 | A1* | 10/2016 | H. Kazerouni .... G08B 21/0277 |
| 2018/0227393 | A1* | 8/2018 | Daub ............ H04L 67/20 |
| 2018/0227735 | A1* | 8/2018 | Gold ............ H04W 4/80 |

OTHER PUBLICATIONS

How Important Is RSSI Value to RFID? RFID Journal (Year: 2017).*

* cited by examiner

*Primary Examiner* — John Van Bramer
*Assistant Examiner* — Brendon Beheshti
(74) *Attorney, Agent, or Firm* — Cantor Colburn LLP; Teddi Maranzano

(57) ABSTRACT

A method includes determining, by a controller, a distance between a baggage owner and at least one piece of baggage of the baggage owner. The baggage owner is at a transportation hub. The method includes determining a first incentive to assign to the baggage owner based at least on the distance. The method includes assigning the first incentive to the baggage owner.

4 Claims, 6 Drawing Sheets

GAMIFICATION SYSTEM FOR MOTIVATING TRAVELERS TO KEEP TRACK OF THEIR BAGGAGE TO IMPROVE TRANSPORTATION HUB SECURITY

BACKGROUND

One or more embodiments relate in general to a gamification system for motivating baggage owners to keep track of their baggage. More specifically, one or more embodiments relate to reducing the number of security false alarms that occur within transportation hubs by reducing the occurrence of unattended baggage within these transportation hubs.

When a baggage owner leaves baggage unattended at a transportation hub, the unattended baggage can appear as a possible high-security risk. These baggage owners can wander away from their baggage without being aware of the potential perceived risks that their unattended baggage can cause to the transportation hub or to other fellow travelers.

SUMMARY

According to one or more embodiments, a method includes determining, by a controller, a distance between a baggage owner and at least one piece of baggage of the baggage owner. The baggage owner is at a transportation hub. The method also includes determining a first incentive to assign to the baggage owner based at least on the distance. The method also includes assigning the first incentive to the baggage owner.

According to one or more embodiments, a computer system includes a memory. The computer system includes a processor system communicatively coupled to the memory. The processor system is configured to perform a method that includes determining a distance between a baggage owner and at least one piece of baggage of the baggage owner. The baggage owner is at a transportation hub. The method also includes determining a first incentive to assign to the baggage owner based at least on the distance. The method also includes assigning the first incentive to the baggage owner.

According to one or more embodiments, a computer program product includes a computer-readable storage medium having program instructions embodied therewith. The computer-readable storage medium is not a transitory signal per se, the program instructions readable by a processor system to cause the processor system to perform a method including determining, by a controller, a distance between a baggage owner and at least one piece of baggage of the baggage owner. The baggage owner is at a transportation hub. The method also includes determining a first incentive to assign to the baggage owner based at least on the distance. The method also includes assigning the first incentive to the baggage owner.

BRIEF DESCRIPTION OF THE DRAWINGS

The subject matter of one or more embodiments is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
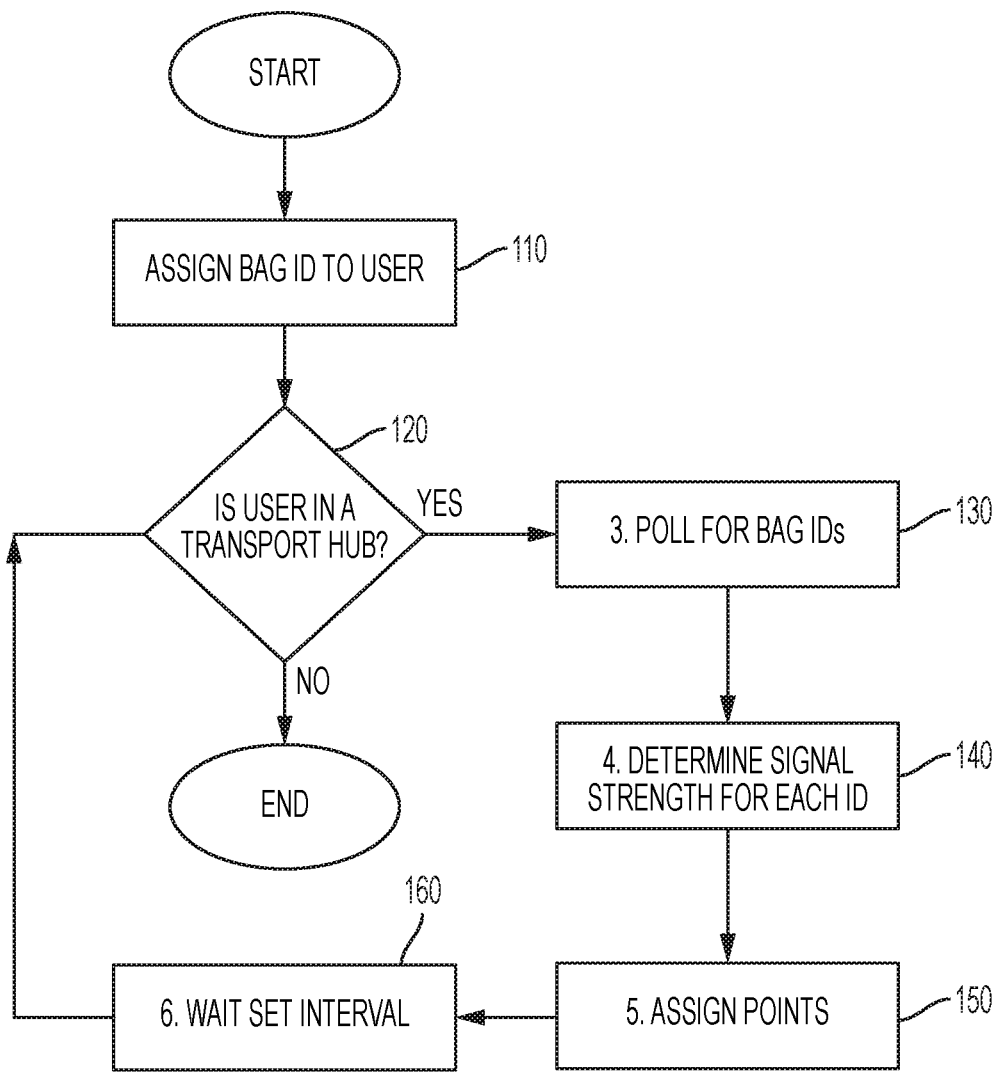
FIG. 1 illustrates a method that is implemented by one or more embodiments.

In accordance with one or more embodiments, methods and computer program products for tracking baggage for improving transportation security are provided. Various embodiments are described herein with reference to the related drawings. Alternative embodiments can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

As described above, when a baggage owner leaves baggage unattended at a transportation hub, the unattended baggage can appear as a possible high-security risk. Unattended baggage can generally be referred to as "orphaned bags." Transportation hubs can include areas such as airports, train stations, and/or bus terminals, etc. Baggage can include luggage, suitcases, and/or carry-on bags.

Baggage can become unattended as baggage owners wander away from their luggage, suitcases, and/or carry-on bags. These baggage owners can wander away from their baggage without being aware of the potential perceived risks that their unattended baggage can cause to the transportation hub or to other fellow travelers. If a traveler or a personnel member of a transportation hub perceives unattended baggage as a potential security risk, the traveler/personnel member will likely alert others of the potential security risk, which can cause panic and/or delays as the unattended baggage is investigated. If the unattended baggage is eventually determined to pose no security risk, then the alerting of others can be considered to be a security false alarm.

In view of the above, one or more embodiments are directed to a system that can reduce the number of security false alarms that occur within transportation hubs by reducing the occurrence of unattended baggage within these transportation hubs. Specifically, one or more embodiments can reduce security false alarms by motivating travelers/baggage owners to stay near their baggage, thus reducing the occurrence of orphaned baggage at transportation hubs.

Gamification generally relates to methods and systems that structure a situation as a game to play. Gamification methods can use rewards/incentives to motivate participants to accomplish a desired task or behavior. One or more embodiments can use gamification in order to motivate travelers/baggage owners to stay near their baggage by providing rewards, incentives, and/or points to the baggage owners.

The system of one or more embodiments can include an application, at least one unique identifier tag, and/or an application/data server. The application can be software-implemented and/or hardware implemented upon a personal device that is owned by and that physically accompanies a baggage owner. Because the personal device physically accompanies the baggage owner who owns the device, the location of the personal device can be considered as being representative of the location of the baggage owner. The application can be implemented upon a personal device that includes at least one of a smartphone, tablet, digital assistant, smart watch, and/or any other type of portable electronic device of the baggage owner. The electronic device can also be provided by the transportation hub to physically accompany the baggage owner. An electronic profile for the baggage owner can also be implemented and stored by the application on the electronic device and/or on the application/data server.

The at least one unique identifier tag can be used to uniquely identify and track a piece of baggage that is owned by the baggage owner. The unique identifier tag can be an electronically-detectable component that can be affixed to the baggage that needs to be identified/tracked. Because the unique identifier tag is affixed to a piece of baggage, the tracked location of the unique identifier tag can be considered as being representative of the location of the piece of baggage. By using the above-described application in conjunction with the unique identifier tag, one or more embodiments can keep track of the location of the luggage in relation to the location of the baggage owner. The application/data server can be used to determine whether the baggage owner has earned incentives/points/rewards and to record the accrued incentives/rewards, as described in more detail below. Incentives/points/rewards that are awarded to baggage owners can be used, for example, to redeem travel discounts, seat upgrades, goods at airport convenience stores, and food at restaurants. For example, 50 earned points can be used to redeem a tube of toothpaste at an airport convenience store.

Therefore, each baggage owner can be assigned an electronic profile (which is accessed by the application that is installed on the personal electronic device of each baggage owner), and each piece of baggage/luggage can be assigned a unique identifier tag. By associating each unique identifier tag with the electronic profile of the baggage owner who owns the corresponding baggage, one or more embodiments can track the distance between the baggage owner and the baggage owner's corresponding baggage at any given time.

With one or more embodiments, a single baggage owner can be associated with multiple pieces of baggage. As such, each baggage owner can keep track of multiple pieces of baggage. In this example, an application can be implemented on a personal electronic device of the baggage owner, and a plurality of unique identifier tags can uniquely identify each piece of baggage that needs to be tracked. Therefore, one or more embodiments can keep track of the location of each piece of luggage in relation to the location of the baggage owner, as described in more detail below.

With another embodiment, a single manager that manages a group of baggage owners can be incentivized to ensure that each baggage owner is in proximity to their corresponding baggage. For example, a chaperone that is traveling with a group of tourists (baggage owners) can be incentivized to ensure that each tourist is in proximity to their corresponding baggage. One or more embodiments can reward the chaperone/manager if it is determined that each tourist is in proximity to their corresponding baggage.

With another embodiment, each piece of luggage can be associated with one or more baggage owners. For example, each piece of luggage can be associated with a primary baggage owner and one or more registered secondary baggage owners. Therefore, the tag identifier of the baggage can be associated with the profile of the primary baggage owner (and thus be associated with the personal device of the primary baggage owner) and also be associated with the profile of the secondary baggage owner (and thus also be associated with the personal device of the secondary baggage owner).

Suppose that the primary baggage owner is carrying a piece of baggage through a transportation hub. Because the primary baggage owner is in close proximity to the piece of baggage, the primary baggage owner is accruing points/incentives. Next, suppose that the primary baggage owner needs to be temporarily separated from the baggage (e.g., the primary baggage owner needs to visit the restroom and wants to leave the baggage outside) and thus the primary baggage owner temporarily passes the baggage to a registered secondary baggage owner (e.g., a spouse of the primary baggage owner). Because the baggage remains in proximity to a registered secondary baggage owner, the baggage remains attended to, and thus one or more embodiments can continue assigning points/incentives to the primary baggage owner and/or the registered secondary baggage owner. In view of the above, one or more embodiments can enable transportation hubs to better allocate their security resources by reducing the number of security false alarms (due to unattended baggage) that the transportation hub must respond to.

FIG. 1 illustrates a method that is implemented by one or more embodiments. At step 110, one or more embodiments assign one or more baggage identifiers to a baggage owner. For example, a personnel member of a transportation hub can assign/associate one or more unique identifier tags (that uniquely identify baggage) to an electronic profile of a baggage owner that owns the corresponding baggage. At step 120, one or more embodiments can use data from a global-positioning-system/geo-fencing-system to identify whether the baggage owner is located within a transportation hub. If the baggage owner is located within a transportation hub (i.e., "yes"), at step 130, one or more embodiments can use the personal device of the baggage owner to scan/poll for the identifier tags (which identify the baggage of the baggage owner). By scanning/polling for the identifier tags, the personal device can determine whether the baggage (associated with the scanned/polled identifier tags) is within a readable range of the personal device/baggage owner. The personal device can also determine the distance between the personal device/baggage owner and the scanned baggage. One or more embodiments can use radio-frequency identification (RFID) to scan/poll for the identifier tags. Although RFID has been described as one example technology that can be used for scanning/polling for identifier tags, other embodiment can use other technologies to scan/poll for identifier tags. For example, other embodiments can use other wireless technologies such as, for example, Bluetooth™, Wi-Fi, ANT+, radio wave, infrared data association, Transfedet, dedicated short range communication, near-field communication, and/or any other similar types of communication technology.

At step 140, one or more embodiments can then determine a signal strength that is associated with each identifier tag in order to ascertain a distance between the baggage and the baggage owner. For example, one embodiment can determine a relative signal strength for each identifier tag that is assigned to the baggage that is owned by the baggage owner. As such, one or more embodiments can measure the distance between each piece of baggage and the baggage owner. At step 150, one or more embodiments assign incentives/points to the baggage owner. In one example, incentives/points can be assigned to the baggage owner based on the measured distance between each bag and the baggage owner. For example, if the baggage owner is closer to their baggage, then the baggage owner can be assigned more points. At step 160, one or more embodiments can repeat the assigning of incentives/points in accordance with a set interval of time. For example, one or more embodiments can assign incentives/points to the baggage owner every second, or every minute, etc.

With one or more embodiments, baggage owners can be awarded points if their bags are located within a fixed range from them (i.e., the baggage owners are within 3 meters of their baggage) at the end of each polling cycle. If baggage owners are outside the range of their baggage, then no points are awarded to the baggage owners.

The amount of points that are awarded per polling cycle can vary based on the signal strength of the identifier tag (which is reflected by the distance between the identifier tag and the personal device of the baggage owner). For example, one or more embodiments can award 5 points per minute to baggage owners who are within 1-3 meters of their baggage. On the other hand, one or more embodiments can award 10 points per minute to baggage owners who are within 1 meter of their baggage. With one or more embodiments, bonus points can be given to baggage owners who keep their baggage within a close range for the entirety of a given trip.

With regard to the process of associating identifier tags to baggage, in order to prevent baggage owners from cheating/subverting the incentive system, with one or more embodiments, the identifier tag of each piece of luggage can be designed to be difficult to remove by the baggage owner. Also, one or more embodiments can configure the identifier tag to be disabled if the identifier tag is removed from its corresponding luggage.

With one or more embodiments, personnel at the transportation hub can provide each identifier tag to the baggage owner during a check-in process. The personnel at the transportation hub can verify that each identifier tag is attached to its corresponding baggage. The personnel at the transportation hub can also verify that the unique identifier tag is associated to the correct baggage owner profile/personal device. In one example, identifier tags that are provided by the transportation hub can be implemented in a form factor that is similar to fold-over sticker luggage tags that are currently used on checked luggage.

Figure 2:
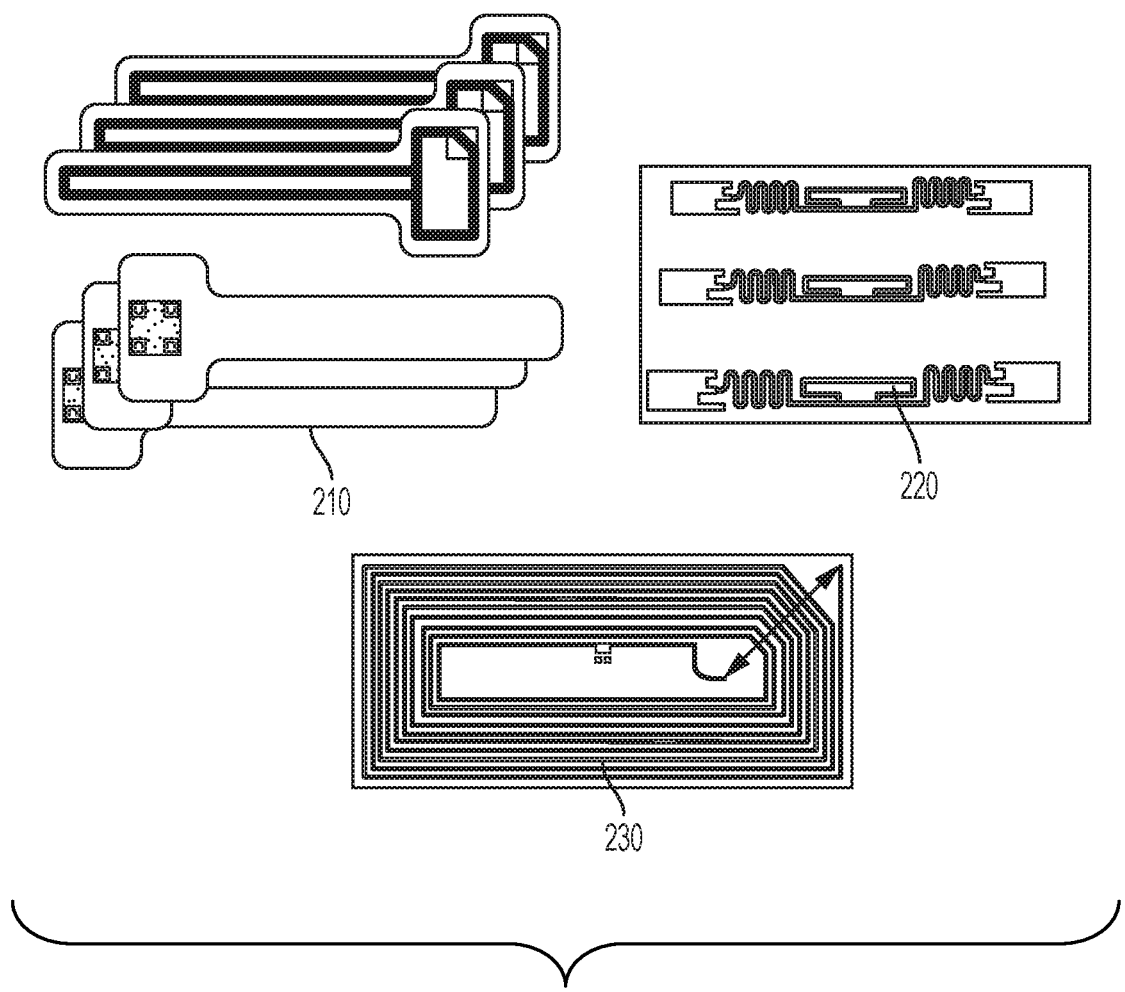
FIG. 2 illustrates example identifier tags in accordance with one or more embodiments.

FIG. 2 illustrates example identifier tags in accordance with one or more embodiments. Referring to FIG. 2, the identifier tag could be a part of a fold-over sticker tag, and the identifier tag can be designed in a manner such that any attempts to pull the identifier tag open (or to cut the identifier tag) would destroy the identifier tag. This design for the identifier tag can generally be referred to as a "break-on removal" design. FIG. 2 illustrates three examples of RFD identifier tags (210, 220, and 230) with "break-on removal" designs.

With one or more embodiments, separate security stickers can be used to detect whether any unauthorized tampering has occurred. In one or more embodiments, the stickers can be configured such that the detection can be performed via visual inspection. In one or more embodiments, separate security stickers can be similar to foil stickers that are used in certain aircraft hatches and shipping containers for passing through customs.

With another embodiment, a baggage owner can purchase an identifier tar in the form of a lock that can be attached to the baggage. The identifier tag can be configured to be disabled in the event that the lock is unlocked. When the baggage owner checks into the transportation hub, personnel at the transportation hub can verify that the identifier tag has been properly attached. At check-in, personnel can verify that the identifier tag has been linked/associated to the correct profile and to the correct personal device of the baggage owner. With another method, an embedded identifier tag can be built within the baggage itself. The embedded tag can be installed in such a way such that removal of the identifier tag renders the baggage unusable.

Figure 3:
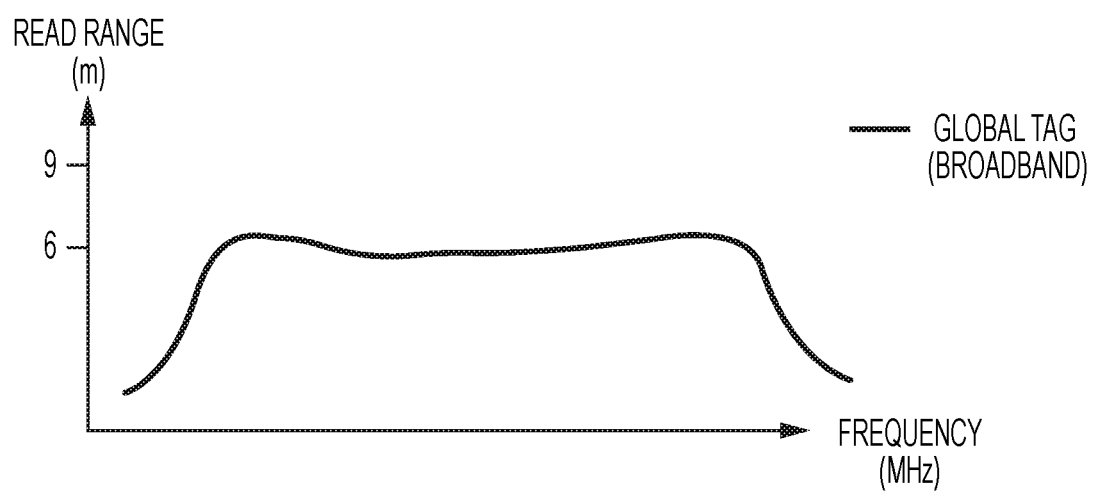
FIG. 3 illustrates a frequency range versus a read range for a global tag, in accordance with one or more embodiments.

FIG. 3 illustrates a frequency range versus a read range for a global tag, in accordance with one or more embodiments. A read range of an identifier tag is generally considered to be a range of distance between the identifier tag and a sensor/detector where the identifier tag is detectable by the sensor/detector. For example, certain RFID identifier tag read ranges can be 9 meters (between the RFID identifier tag and the sensor/detector). In the example of FIG. 3, a global identifier tag read range is 6 meters, and thus the global tag is detectable up to 6 meters away from the sensor/detector. The 6-meter read range is generally a large enough distance such that baggage owners can place their baggage in the overhead compartment without leaving the read range of the baggage, and thus the baggage owner can avoid losing points or setting off security false alarms when placing the baggage in the overhead compartment.

Figure 4:
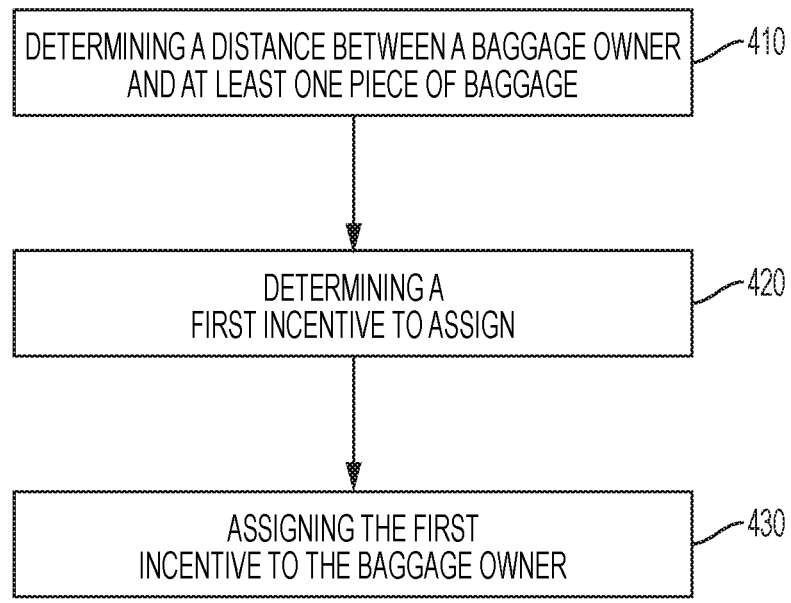
FIG. 4 depicts a flowchart of a method, in accordance with one or more embodiments.

FIG. 4 depicts a flowchart of a method in accordance with one or more embodiments. The method of FIG. 4 can be performed by a controller of a system that is configured to provide incentives to baggage owners. The system can be a part of or integrated with a check-in system of a transportation hub. The incentive system can also be a third-party system. The method of FIG. 4 can also be performed by a processor of an application server of the incentive system. The application server can be a special-purpose application server that performs the specific functionality illustrated by FIG. 4. The method includes, at block 410, determining, by a controller, a distance between a baggage owner and at least one piece of baggage of the baggage owner. The baggage owner is at a transportation hub. The method includes, at block 420, determining the first incentive to assign to the baggage owner based at least on the distance. The method includes, at block 430, assigning the first incentive to the baggage owner.

Figure 5:
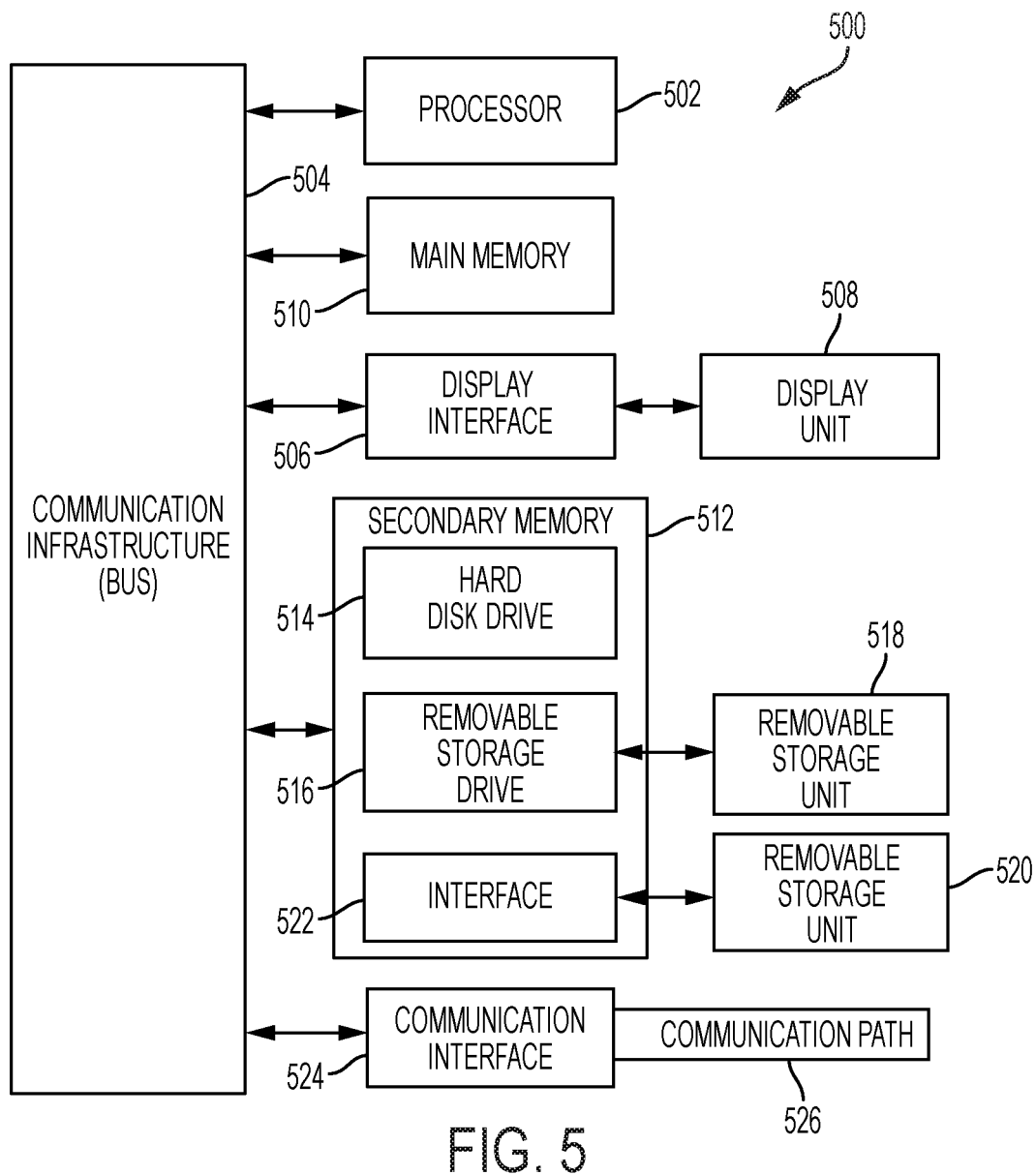
FIG. 5 depicts a high-level block diagram of a computer system, which can be used to implement one or more embodiments.

FIG. 5 depicts a high-level block diagram of a computer system 500, which can be used to implement one or more embodiments. Computer system 500 can correspond to, at least, an application server, a personal device of the baggage owner, and/or a hardware component of the identifier tag, for example. Computer system 500 can be used to implement hardware components of systems capable of performing methods described herein. Although one exemplary computer system 500 is shown, computer system 500 includes a communication path 526, which connects computer system 500 to additional systems (not depicted) and can include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and can also include a secondary memory 512. Secondary memory 512 can include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also can be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 can include other similar means for allowing computer programs or other instructions to be loaded into the computer system. Such means can include, for example, a removable storage unit 520 and an interface 522. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 can also include a communications interface 524. Communications interface 524 allows software and data to be transferred between the computer system and external devices. Examples of communications interface 524 can include a modem, a network interface (such as an Ethernet card), a communications port, or a PC card slot and card, a universal serial bus port (USB), and the like. Software and data transferred via communications interface 524 are in the form of signals that can be, for example, electronic, electromagnetic, optical, or other signals capable of being received by communications interface 524. These signals are provided to communications interface 524 via a communication path (i.e., channel) 526. Communication path 526 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 510 and secondary memory 512, removable storage drive 516, and a hard disk installed in hard disk drive 514. Computer programs (also called computer control logic) are stored in main memory 510 and/or secondary memory 512. Computer programs also can be received via communications interface 524. Such computer programs, when run, enable the computer system to perform the features discussed herein. In particular, the computer programs, when run, enable processor 502 to perform the features of the computer system. Accordingly, such computer programs represent controllers of the computer system. Thus it can be seen from the foregoing detailed description that one or more embodiments provide technical benefits and advantages.

Figure 6:
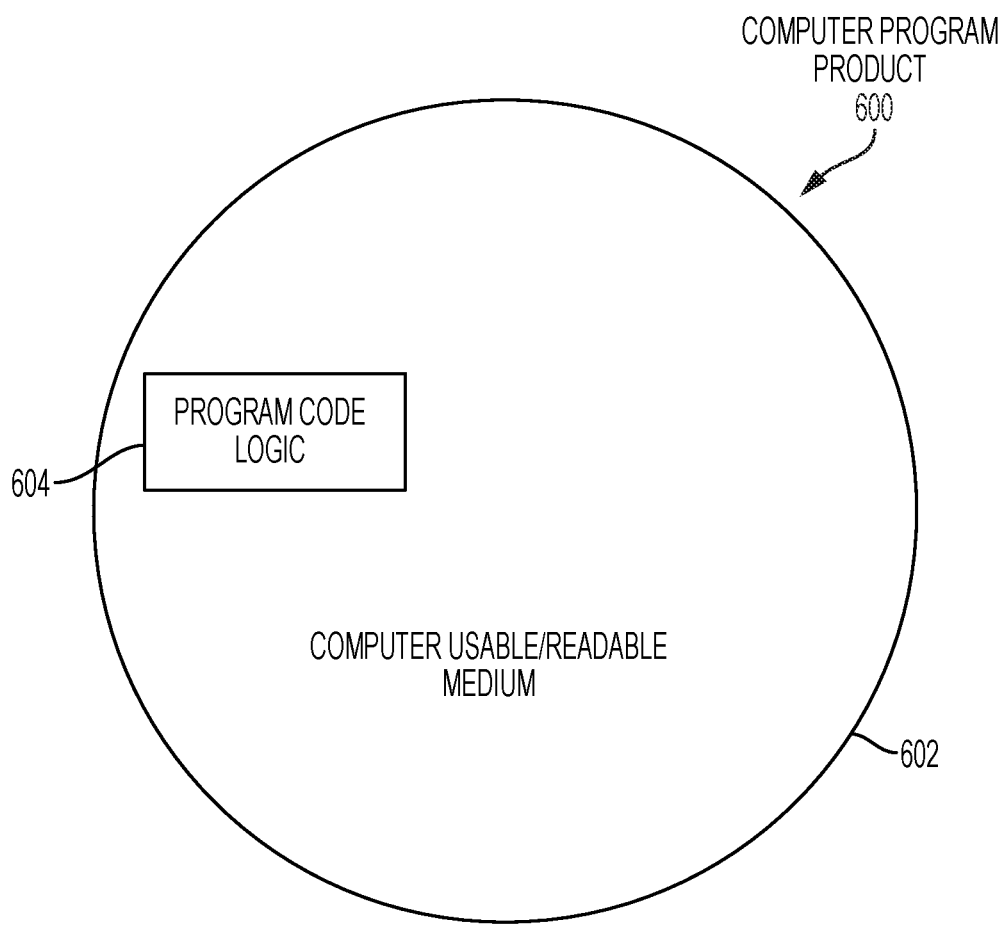
FIG. 6 depicts a computer program product, in accordance with one or more embodiments.

FIG. 6 depicts a computer program product 600, in accordance with an embodiment. Computer program product 600 includes a computer-readable storage medium 602 and program instructions 604.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A baggage tracking system comprising:
    a memory; and
    a processor system communicatively coupled to the memory;
    the processor system configured to perform a method comprising:
        determining, by a primary personal device, a primary baggage owner distance between the primary personal device of a primary baggage owner and a radio-frequency identifier tag affixed to baggage associated with the primary baggage owner, the primary baggage owner distance being based on a first signal strength between the radio-frequency identifier tag and the primary personal device;
        determining, by a secondary personal device, a secondary baggage owner distance between the secondary personal device and the radio frequency identifier tag affixed to the baggage associated with the primary baggage owner, the secondary baggage owner distance being based on a second signal strength between the radio-frequency identifier tag and the secondary personal device;

determining whether at least one of the primary baggage owner and the secondary baggage owner is within a proximity of the baggage based at least in part on the primary baggage owner distance and the secondary baggage owner distance;

determining a first incentive to assign to the primary baggage owner based on the primary baggage owner distance;

determining a second incentive to assign to the secondary baggage owner based on the secondary baggage owner distance;

responsive to determining that the primary baggage owner is within the proximity, assigning the first incentive to the primary baggage owner; and responsive to determining that the primary baggage owner is not within the proximity and responsive to determining that the secondary baggage owner is within the proximity, assigning the second incentive to the secondary baggage owner.

2. The baggage tracking system of claim 1, wherein a closer determined distance corresponds to a greater determined first incentive.

3. The baggage tracking system of claim 1, wherein the assigning the first incentive comprises assigning the first incentive to an electronic profile of the baggage owner, and the first incentive is redeemable for different rewards.

4. The baggage tracking system of claim 1, wherein the processor system is further configured to assign a third incentive to a manager of the baggage owner if the first incentive is assigned to the baggage owner.

* * * * *